Feb. 15, 1966     M. V. SHELANSKI     3,235,631
POLARIZATION PROCESS
Filed Aug. 23, 1962
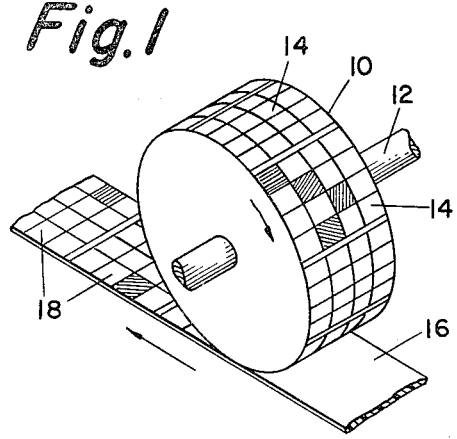
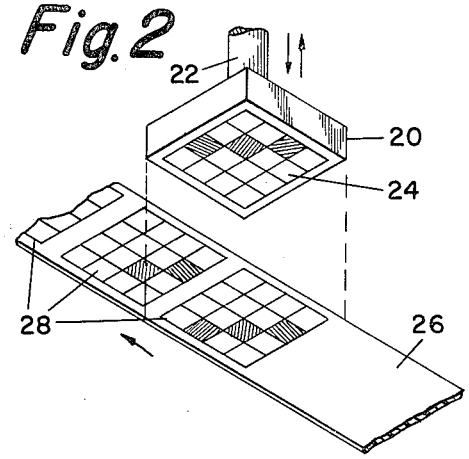
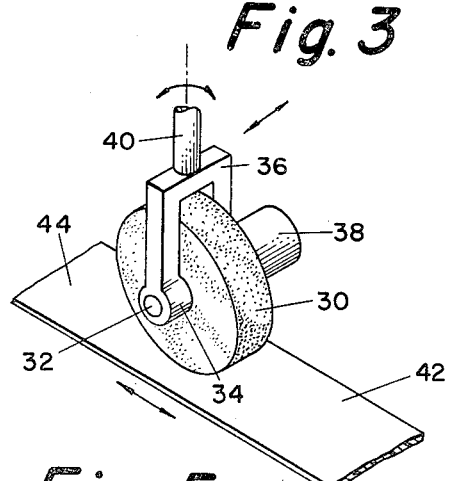
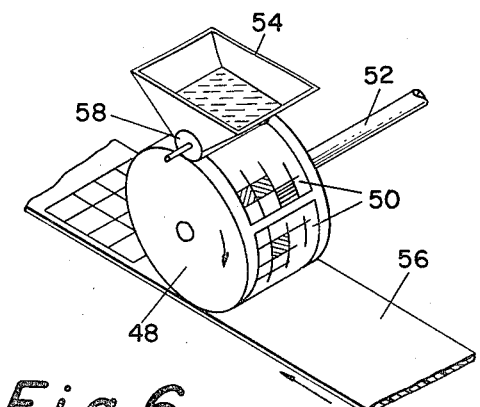
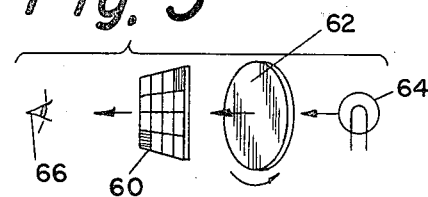
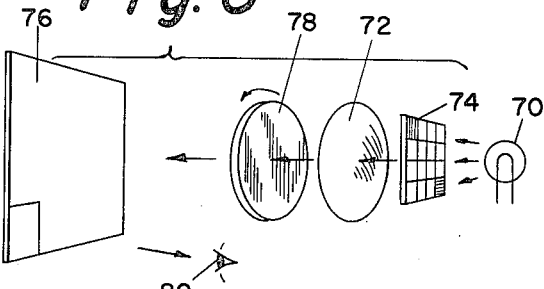
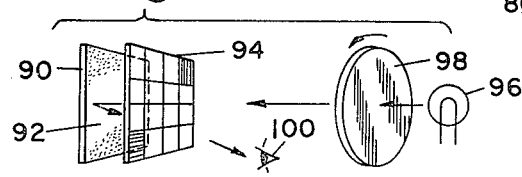
INVENTOR.
MORRIS V. SHELANSKI
BY
Arthur A. Jacobs
ATTORNEY United States Patent Office 3,235,631
Patented Feb. 15, 1966

1

3,235,631
POLARIZATION PROCESS
Morris V. Shelanski, Gulph Mills, Pa., assignor to Industrial Biology Laboratories, Inc., Philadelphia, Pa., a corporation of Pennsylvania
Filed Aug. 23, 1962, Ser. No. 219,026
7 Claims. (Cl. 264—2)

This invention relates to light polarizing materials, and it particularly relates to novel polarizing materials and to novel processes for the production thereof.

It was heretofore known to produce a light-polarizing polymeric film by stretching an iodine-stained polymeric film in a certain direction so that light in only one plane was permitted to pass through. In these prior methods, it was necessary to stain and stretch strips of film and then cut the film into sections. These sections then had to be mounted at different angles on a single plane so that light passing therethrough became polarized at different angles to each other.

A very serious disadvantage of the above type of method was the fact that painstaking care and skill were required to stretch, stain, cut and mount the polarized sections in the proper positions and orientations, and it was very difficult, if not impossible, to duplicate a variably polarized film assembly made in this manner because of the many individual hand operations involved. The result was that the film was exceedingly expensive and difficult to obtain. Furthermore, there could never exist the certainty that one such film assembly would be sufficiently like another to permit them to be used interchangeably.

It is one object of the present invention to overcome the disadvantages mentioned above by providing a simple, easy, rapid and inexpensive process for obtaining variably polarized films Another object of the present invention is to provide an improved process of the aforesaid type wherein the identical product may be reproduced as often as desired whereby complete standardization is attained, interchangeability achieved, and mass production made possible.

Other objects and many of the attendant advantages of this invention will be readily appreciated as the same becomes better understood by reference to the following description when read in conjunction with the accompanying drawings wherein:

FIG. 1 is a fragmentary perspective view of one type of apparatus used to produce the polarized film of this invention.

FIG. 2 is a fragmentary perspective view of a second type of apparatus utilizable in the practice of this invention.

FIG. 3 is a fragmentary perspective view of a third type of apparatus utilizable in the practice of this invention.

FIG. 4 is a fragmentary, somewhat diagrammatic, perspective view of a fourth type of apparatus utilizable in the practice of this invention.

FIG. 5 is a diagrammatic view showing one utilization of the present invention.

FIG. 6 is a diagrammatic view showing a second type of utilization of the present invention.

FIG. 7 is a diagrammatic view showing a third type of utilization of the present invention.

In accordance with the present invention, it has now been discovered that orientation of the molecules in a film and consequent polarization can be achieved not only by stretching in the plane of the film but also by applying pressure in a plane transverse to the surface plane of the film. This pressure may be a surface pressure

2 such as caused by polishing or buffing, or it may be a penetrative pressure whereby indentations or grooves are scribed into the surface. However, when a scribing or penetrative pressure is used, care must be taken to avoid piercing the film through from front to rear surface since such complete penetration would only serve to remove all the film in that spot or area.

The polarization by means of scribing or buffing makes it possible to use dies or rollers of uniform pre-formed configuration whereby each piece of treated polarized film is always identical with each other piece so treated since identical patterns and pressures are always used. One manner of accomplishing this is shown in FIG. 1 where a die roller 10 is mounted on a shaft 12 connected to a drive means (not shown). The periphery of the roller 10 is provided with a plurality of embossed patterns 14 of predetermined configuration. These inscribed patterns are identical to each other and each contains a plurality of square or rectangular sections, each section containing inscribed lines or ribs extending in a direction and angle different from the lines or ribs in the other sections. The size, number, form, etc. of the sections may be varied as desired. A strip of film 16 is passed underneath the roller 10 in such a manner that the roller exerts a predetermined amount of pressure on the strip while it simultaneously rotates on its axis. This causes indented patterns 18 to be inscribed on the strip as it passes under the rotating roller.

Instead of a roller-type die, a stamping plate or punch may be used. This is illustrated in FIG. 2 where there is shown a vertically reciprocable die plate 20 mounted on a rod 22 attached to a reciprocating means (not shown). The underface of the die plate is provided with an embossed or ribbed pattern 24 similar to those provided on the roller die of FIG. 1. The reciprocable die or plunger 20 is illustrated as scribing a pattern 26 on a strip of prepared film 28 which moves linearly thereunder in timed relationship to the reciprocation. The timed relationship can be effected by any one of a great many standard mechanisms and further illustration or description of a particular mechanism is not here necessary. The die plate 20 may also, if desired, be used manually for inscribing individual plates.

The effective pressure of the scribing apparatus (either in the form of the roller or punch) may be straight down or it may be somewhat angular whereby there is a compound pressure both in the vertical and horizontal direction. This angular pressure is obtained by making the scribing lines or ribs of the pattern angular. The angular scribing is preferable since it provides a wider divergence of molecular orientation.

As indicated above, polarization may also be obtained by surface pressure such as caused by buffing or polishing. This surface pressure effect can be used to form definite patterns by using a buffing or polishing wheel which is given compound movement, to wit, rotation on its axis for the surface pressure and a twisting or angular movement on an axis transverse to its axis of rotation. This type of apparatus is illustrated in FIG. 3 where a buffing wheel or roller 30 is mounted for rotation on a shaft 32 journaled in bearings 34 integral with a yoke 36. A motor 38 is operatively connected to the shaft 32 and to a source of electrical energy (not shown), the motor being used to rotate the shaft 32 in its bearings 34. The yoke 36 is integral with an upwardly extending rod 40 which is, in turn, operatively connected to a second motor (not shown) for rotation thereby. By means of this construction, while the roller 30 rotates on its axis 32, the entire yoke assembly is simultaneously rotated in conjunction with the rotation of rod 40. Consequently, as the strip of film 42 moves linearly, the buffing roller 30 exerts both a downward and a twisting pressure on its surface whereby a pattern, indicated at 44, is formed. This pattern conforms to the constantly changing pressure areas, as diagrammatically shown.

Although the apparatus of FIG. 3 has been described in conjunction with two separate motors, one motor may be used for providing both rotations, such motor being operatively connected, in well-known manner, to both the shaft 32 and rod 40 by means of gears or belts or other such mechanical expedients.

Before the film strip, coated plate, or the like, has been molecularly oriented by one of the above methods, it is stained with an iodine-containing stain by dipping, spraying, painting or any other desirable method. Dipping is preferred because it provides the fullest area coverage and deepest penetration of the stain into the film whereby the film is, in effect, impregnated. In this manner, a relatively deep impression may be inscribed in the film, when scribing apparatus is being used, without cutting through the stained layer.

The iodine solution should be applied in sufficient quantity to effect a deep blue color in the film after the stained film has been allowed to stand for some minutes. It has been found that if the film is slightly moistened with water prior to application of the iodine solution or if the iodine solution is applied while the film is in a moist or damp atmosphere, the desirable deep blue color is most easily and effectively obtained.

In addition to the methods utilizing either scribing or buffing of a previously iodine-stained film, as described above, the polarization may be carried out by imprinting the film directly with an iodine-containing staining solution whereby a pattern is formed similar to those formed with the apparatus of FIGS. 1, 2 and 3. Such an imprinting method is illustrated in FIG. 4 where a printing roller 48, having embossed patterns 50 on its periphery, is mounted on a drive shaft 52 connected to a standard drive means (not shown). The roller 48 is fed with a staining solution from a trough 54 during one portion of its rotation and imprints the patterns on the linearly moving film strip 56 during another portion of its rotation. The staining solution is applied to the printing roller 48 by means of one or more applicator rollers such as indicated at 58. In the same manner, a reciprocating, plunger-type printing die head may be used similar to the inscribing apparatus shown in FIG. 2.

The film of coating used in the present invention is a polymeric material and preferably polyvinyl alcohol. In this respect, good results have been obtained with an incompletely hydrolized polyvinyl acetate wherein about 90 percent of the groupings are polyvinyl alcohol and about 10 percent are acetate groupings.

The staining solution is preferably a mixture of iodine and an alkali metal iodide such as potassium iodide in approximately equal molecular proportions.

Illustrative of the manufacture of films utilized in the present invention are the following examples, no intent being here implied to limit the invention otherwise than as claimed:

*Example 1*

10 g. of polyvinyl alcohol (Elvanol 7105 produced by E. I. du Pont de Nemours & Co., Inc., Wilmington, Del.) were dissolved in 100 ml. of water at a temperature of about 90–100° C. This solution was deposited on the surface of a strip of cellulose triacetate in amount of about 16 mg. of solution per square inch of strip. The coated strip was then dried in air for 24 hours at room temperature, resulting in the formation of a solid film of polyvinyl alcohol on the surface of the strip. The film was then stained with a staining solution.

The staining solution comprised about 250 mg. iodine and about 175 mg. potassium iodide, the solution being diluted to about 25 ml. with methyl alcohol. This staining solution was poured over the film and allowed to dry, resulting in a deposition of about 1 ml. of the staining solution for each square inch of film. The staining solution dried almost immediately and the film was ready for polarization.

*Example 2*

The same procedure was followed as in Example 1 above except that in place of Elvanol 7105, there was substituted a similar amount of Elvanol 52–22 made by the same manufacturer but containing about 10–11 percent acetate groupings, the remainder being polyvinyl alcohol. The resulting film proved to be substantially similar to that produced in Example 1 insofar as its ability to be polarized was concerned, both being excellently polarized by surface pressure techniques such as illustrated in the drawings and described above.

It is to be understood that although the film has been specifically described as a coating on a base, it may be formed in any other desired manner within the scope of the present invention. For example, it may be made by casting, extruding, etc., in the form of a unitary shaped body requiring no support base.

Furthermore, the oriented and stained film may have imposed thereon a desired design or picture and then be encapsulated between two flat transparent sheets or plates whereby a permanent, protected assembly is provided. This is especially desirable when the film is to be used on billboards, or the like, which are constantly exposed to rain, snow and the other elements.

FIG. 5 illustrates one use of the present invention wherein direct viewing is provided. In this illustration, a film 60, stained, molecularly oriented and imprinted with a desired image or design, is mounted in front of a rotatable, polarized, transparent disc 62, the disc 62 being positioned between the film 60 and a source of light 64. Upon viewing the image on the film 60 from the position illustrated by the eye 66 and when the disc 62 is rotating, the differently polarized areas of the film will permit light from the source 64 to pass therethrough in accordance with the corresponding rotatable position of the disc, the polarized plane of the disc being continuously changed in its position as the disc rotates. In each rotative position of the disc its plane of polarization, therefore, corresponds with the polarized plane of a different polarized area of the film and consequently as different areas of the film light up, there is an illusion of movement of the image thereon.

In FIG. 6, the present invention is illustrated for the purpose of protecting an image on a screen in the manner of a slide but with the illustion of motion. The apparatus illustrated comprises a source of light 70 and a lens 72 between which is positioned a treated film 74 which has been stained, molecularly oriented and upon which an image has been imposed. A viewing screen 76 is aligned with the lens 72 and between the lens and the screen is rotatably positioned a polarized disc 78 similar to disc 62. As the disc 78 rotates, it permits light from the source to pass through the different polarized areas of the film 74 and as the images on these different areas are projected onto the screen, there is an illusion of motion when viewed from a position such as indicated at 80.

In FIG. 7 there is illustrated an arrangement wherein the invention is applied to a billboard or the like. In this arrangement the billboard 90 is illustrated as having a reflective surface 92 with the treated film 94, similar to films 60 and 74, in spaced relation thereto. However, in practice, the film may, and preferably is, mounted directly on the reflector surface 92. Between the film 94 and a source of light 96 is mounted a rotatable polarized disc 98, similar to discs 62 and 72. As the disc 98 rotates, an illusion of motion is created on the exposed front surface of the film 94 when viewed from a position such as indicated at 100.

In the arrangement illustrated in FIG. 5, the polarized disc is shown between the source of light and the treated film, while in the arrangement of FIG. 6, the treated film is shown between the source of light and the polarized disc. The invention has been so illustrated to show that it is a matter of choice as to the relative positions of the film and polarized disc in relation to the source of light since the desired effect will be obtained in either arrangement.

Obviously many modifications and variations of the present invention are possible in the light of the above teachings. It is, therefore, to be understood that within the scope of the appended claims, the invention may be practiced otherwise than as specifically described.

The invention claimed is:

1. A method of making a variably polarized film which comprises forming a film consisting at least partially of polyvinyl alcohol, staining at least one surface thereof with an iodine-containing stain, imposing areas of variable planes of polarity on said stained surface by applying predetermined patterns of pressure on said surface, said patterns comprising at least two differently directed lines of pressure, said lines extending in their different directions in the common plane of said surface, said pressure being applied in directions at least partially transverse to the plane of said stained surface, and then imposing an image on said stained surface.

2. The method of claim 1 wherein said patterns of pressure are applied by scribing said stained surface with preformed scribing patterns.

3. The method of claim 1 wherein said patterns of pressure are applied by buffing said stained surface with a rotating buffing wheel while simultaneously twisting said buffing wheel on an axis transverse to its axis of rotation.

4. The method of claim 1 wherein said stain and said patterns of pressure are applied simultaneously by imprinting said surface with said iodine-containing stain arranged in predetermined print patterns.

5. The method of claim 1 wherein said stain is an iodine-containing solution in alcohol.

6. The method of claim 1 wherein said stain comprises an alcohol solution of iodine and an alkali metal iodide.

7. The method of claim 1 wherein said stain comprises a solution in methyl alcohol of approximately equal molecular proportions of iodine and potassium iodide.

References Cited by the Examiner
UNITED STATES PATENTS

| | | | |
|---|---|---|---|
| 1,858,702 | 5/1932 | Chambers | 240—9.5 |
| 2,165,974 | 7/1939 | Land | 40—130 |
| 2,306,108 | 12/1942 | Land | 18—56 |
| 2,348,912 | 5/1944 | Land | 88—65 |
| 2,354,243 | 7/1944 | Blake | 264—2 X |
| 2,359,428 | 10/1944 | Land | 18—57 |
| 2,380,363 | 7/1945 | Land et al. | 264—2 X |
| 2,494,686 | 1/1950 | Blake | 264—2 X |
| 2,647,440 | 8/1953 | Rehorn | 88—65 |
| 2,838,864 | 6/1958 | Guida | 40—130 |
| 2,887,566 | 5/1959 | Marks | 240—9.5 |
| 2,996,956 | 8/1961 | Ryan et al. | 264—2 X |

ALEXANDER H. BRODMERKEL, *Primary Examiner.*

DAVID H. RUBIN, ALFRED L. LEAVITT, *Examiners.*